(12) United States Patent
Beck et al.

(10) Patent No.: US 11,093,593 B2
(45) Date of Patent: Aug. 17, 2021

(54) USER AUTHENTICATION FOR PROTECTED ACTIONS

(71) Applicant: Lenovo (Singapore) Pte. Ltd., Singapore (SG)

(72) Inventors: Kevin Wayne Beck, Raleigh, NC (US); Russell Speight VanBlon, Raleigh, NC (US); Thorsten Peter Stremlau, Morrisville, NC (US); Joseph Michael Pennisi, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 348 days.

(21) Appl. No.: 16/105,492

(22) Filed: Aug. 20, 2018

(65) Prior Publication Data

US 2020/0057845 A1   Feb. 20, 2020

(51) Int. Cl.
*G06F 21/00* (2013.01)
*G06F 21/31* (2013.01)
*G06F 21/32* (2013.01)

(52) U.S. Cl.
CPC ............ *G06F 21/316* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 9,760,697 B1* | 9/2017 | Walker | G06F 21/645 |
| 9,911,290 B1* | 3/2018 | Zalewski | G06Q 20/327 |
| 10,013,547 B2* | 7/2018 | Aurongzeb | G06F 1/1626 |
| 10,139,820 B2* | 11/2018 | Liu | G05D 1/0038 |
| 10,298,293 B2* | 5/2019 | Gerszberg | H04B 3/54 |
| 2011/0214158 A1* | 9/2011 | Pasquero | H04B 5/00 726/2 |
| 2012/0293642 A1* | 11/2012 | Berini | G06F 21/602 348/77 |
| 2013/0215275 A1* | 8/2013 | Berini | G06F 21/32 348/150 |
| 2013/0301497 A1* | 11/2013 | Gonikberg | H04W 4/023 370/311 |
| 2014/0108241 A1* | 4/2014 | Tunnell | G06Q 20/363 705/41 |
| 2015/0106621 A1* | 4/2015 | Burke | G06Q 20/40145 713/168 |

(Continued)

OTHER PUBLICATIONS

Bhartiya, Namrata et al. Biometric Authentication Systems: Security Concerns and Solutions. 2018 3rd International Conference for Convergence in Technology (I2CT). https://ieeexplore.IEEE.org/stamp/stamp.jsp?tp=&arnumber=8529435 (Year: 2018).*

(Continued)

*Primary Examiner* — Jeremiah L Avery
(74) *Attorney, Agent, or Firm* — Ference & Associates LLC

(57) ABSTRACT

One embodiment provides a method, including: receiving, at an information handling device, a touchless command to perform an action; determining, using a processor, whether the action is one of: a protected action and an unprotected action; and requesting, responsive to determining that the action is associated with a protected action, user authentication input prior to performing the action. Other aspects are described and claimed.

18 Claims, 3 Drawing Sheets

(56) References Cited

U.S. PATENT DOCUMENTS

| | | | |
|---|---|---|---|
| 2015/0213661 A1* | 7/2015 | Robertson | G07C 9/00571 |
| | | | 340/5.61 |
| 2016/0037345 A1* | 2/2016 | Margadoudakis | H04W 12/02 |
| | | | 455/411 |
| 2019/0080189 A1* | 3/2019 | Van Os | H04L 63/0861 |
| 2019/0182415 A1* | 6/2019 | Sivan | G06F 3/013 |

OTHER PUBLICATIONS

Chatterjee, Amit et al. A Low-Cost Optical Sensor for Secured Antispoof Touchless Palm Print Biometry. IEEE Sensors Letters, vol. 2, Issue: 2. https://ieeexplore.IEEE.org/stamp/stamp.jsp?tp=&arnumber=8360514 (Year: 2018).*

* cited by examiner

USER AUTHENTICATION FOR PROTECTED ACTIONS

BACKGROUND

Information handling devices ("devices"), for example smart phones, tablet devices, smart speakers, laptop and personal computers, and the like, may be capable of receiving user command inputs. For example, a user may interact with a digital assistant resident on a device via an input device (e.g., a voice input module, a gesture input module, a touch input module, etc.) to provide various types of command inputs (e.g., queries, action requests, etc.). Responsive to receiving a user command input, the digital assistant may perform a corresponding function or provide a corresponding output.

BRIEF SUMMARY

In summary, one aspect provides a method, comprising: receiving, at an information handling device, a touchless command to perform an action; determining, using a processor, whether the action is one of: a protected action and an unprotected action; and requesting, responsive to determining that the action is associated with a protected action, user authentication input prior to performing the action.

Another aspect provides an information handling device, comprising: a processor; a memory device that stores instructions executable by the processor to: receive a touchless command to perform an action; determine whether the action is one of: a protected action and an unprotected action; and request, responsive to determining that the action is associated with a protected action, user authentication input prior to performing the action.

A further aspect provides a product, comprising: a storage device that stores code, the code being executable by a processor and comprising: code that receives a touchless command to perform an action; code that determines whether the action is one of: a protected action and an unprotected action; and code that requests, responsive to determining that the action is associated with a protected action, user authentication input prior to performing the action.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
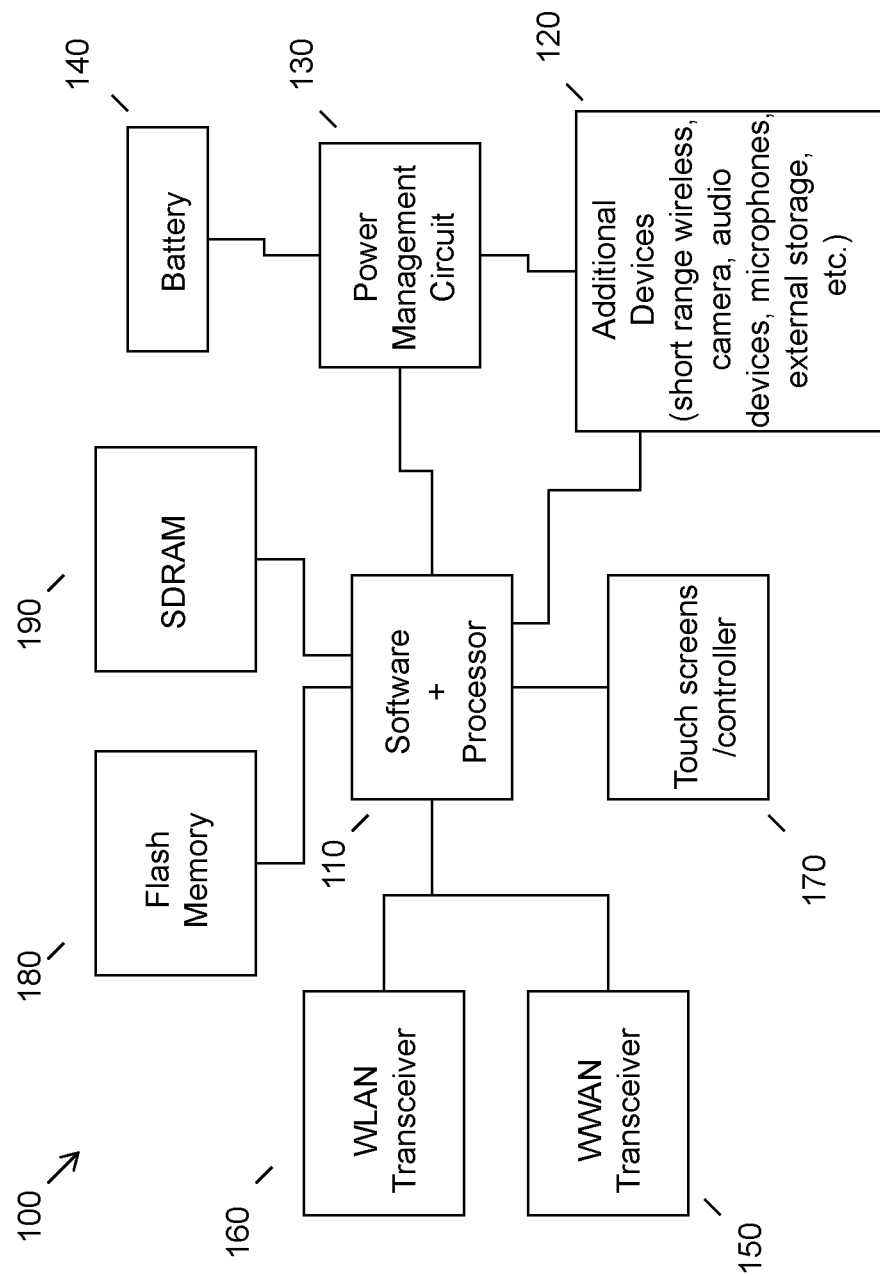
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently utilize devices to execute a variety of different types of commands or queries. One method of interacting with a device is to use digital assistant software employed on the device. Digital assistants are able to perform actions that are responsive to a variety of different types of user commands (e.g., voice commands, gesture commands, etc.). As technology has progressed, the types of commands executable by a digital assistant have grown in type and number. While most of these commands are relatively harmless (e.g., receiving a command to play a song, receiving a command to open an application, receiving a command to disconnect from a network, etc.), many may be much more sensitive. For example, a command received to delete a file or change a major computer setting may have dramatic consequences. Additionally, due to the fact that many of these sensitive commands may be provided via a touchless input modality (e.g., voice input, gesture input, etc.), a bad actor or unauthorized user may be able to more easily control a device to execute a sensitive command (e.g., without logging in to a device, without physically touching the device, etc.). Due to the foregoing, a need exists for a way to differentiate between actions corresponding to touchless commands that are generally always allowed and actions corresponding to touchless commands that are associated with a higher sensitivity and require user authentication.

Conventionally, user authentication is generally accomplished by receipt of a password (e.g., provided using touch input, voice input, etc.). However, much of the utility and desirability of a touchless digital assistant is the ability to invoke commands without physical input. Therefore, many digital assistants do not even have a touch input means of providing such a password. Additionally, if a bad actor obtains knowledge of the password they can simply provide the password themselves, either by touch or voice input. Another conventional method of authenticating a user is by utilizing speaker recognition/voice printing/voice matching techniques. However, these techniques are not always reliable nor are they capable of being integrated into larger scale identity management schemes to enable authentication across devices. Additionally, these techniques are also considered less secure/easier to hack than other biometric methods due to the ease of obtaining voice samples from web video, phone calls, secret records, and the like.

Accordingly, an embodiment provides a method for authenticating a user responsive to determining that an action corresponding to the command is a protected, or sensitive, action. In an embodiment, a touchless command (e.g., provided via voice input, gesture input, etc.) may be received at a device. An embodiment may thereafter determine whether an action corresponding to the command is associated with a protected action or an unprotected action. Responsive to determining that the action corresponds to a protected action, an embodiment may request user authentication input prior to performing the action. In an embodiment, authentication may be performed locally, on the device, or may be performed using at least one other device. Responsive to authenticating an authorized user, an embodiment may perform the action. Such techniques provide greater security for actions requested to be performed by a device while still allowing users the convenience of providing commands using touchless input methods.

Such a method may therefore inform a user that a non-personal device has recognized a user's identity and is capable of performing user-specific functions and/or loading user-specific settings.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes one or more touch screens 170 for data input and display/rendering. System 100 also typically includes various memory devices, for example flash memory 180 and SDRAM 190.

Figure 2:
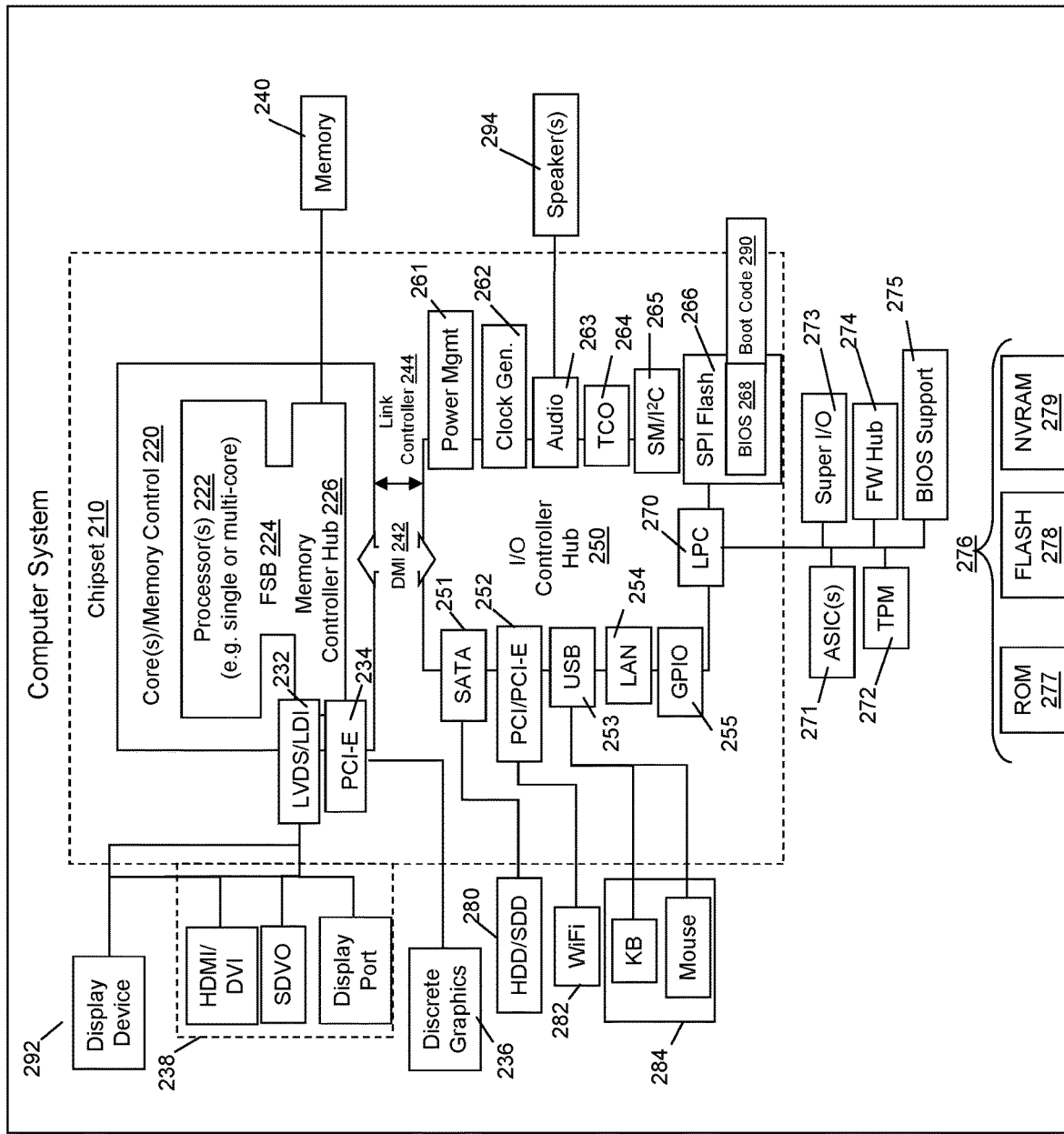
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart speakers, smart appliances, personal computer devices generally, and/or electronic devices that are capable of supporting a digital assistant that may receive and process user inputs. For example, the circuitry outlined in FIG. 1 may be implemented in a tablet or smart phone embodiment, whereas the circuitry outlined in FIG. 2 may be implemented in a laptop embodiment.

Figure 3:
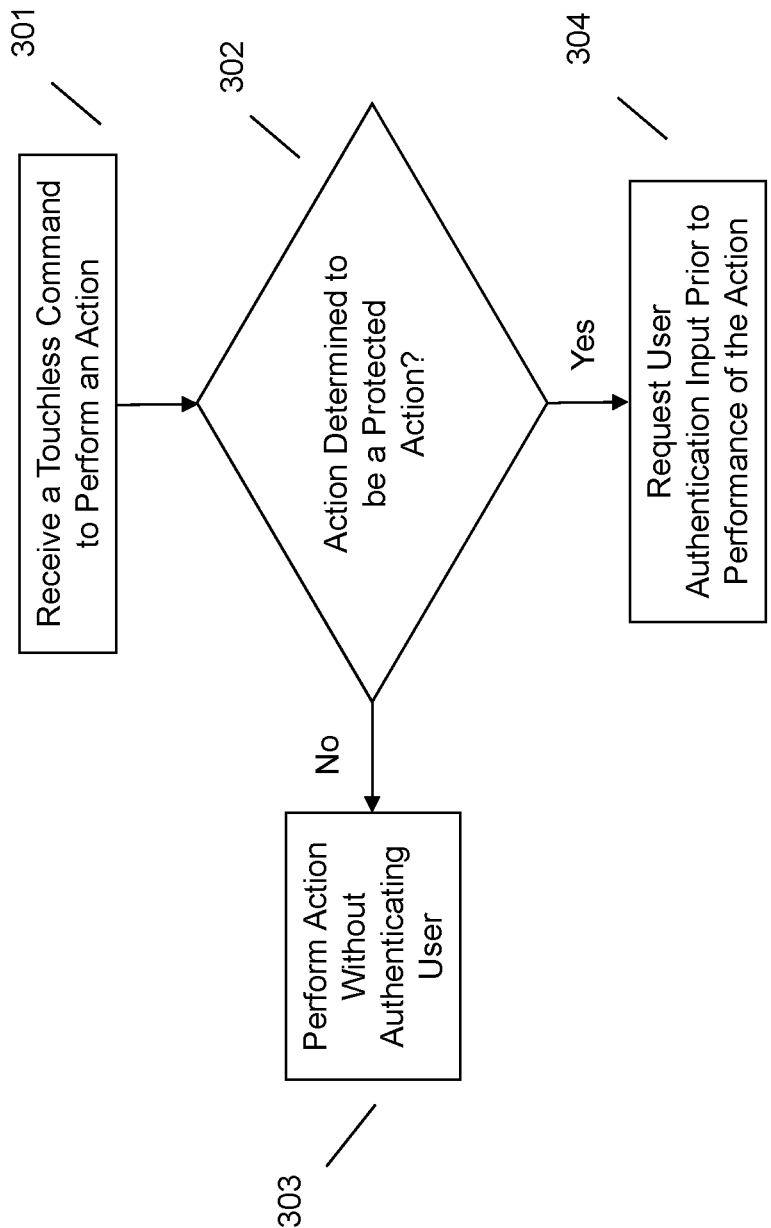
FIG. 3 illustrates an example method of authenticating a user providing a touchless command corresponding to a protected action.

Referring now to FIG. 3, an embodiment may authenticate a user responsive to determining that an action corresponding to the command is a protected action. At 301, an embodiment may receive a command to perform an action. In an embodiment, the command may be a touchless command provided by one or more touchless input methods (e.g., voice input, gesture input, etc.). The touchless command may be captured or detected by one or more input devices (e.g., microphones, cameras, etc.) operatively or integrally coupled to the device. For simplicity purposes, voice commands will be referred to throughout this application and will be representative of a touchless command. However, such a designation is not intended to be limiting and other touchless commands may be utilized in lieu of, or in combination with, voice commands.

In an embodiment, an action corresponding to a command may be one of an unprotected action or a protected action. Generally, as the terms are used in this application, unprotected actions may be performed without authenticating the command provider whereas protected actions require authentication of the command provider prior to execution of the action. Non-limiting examples of unprotected actions may include the playing of a media file, statement of the date and/or time, provision of navigational directions, etc. Non-limiting examples of protected actions may include the deletion of a file, change to a major system setting, commencement of a financial transaction, etc.

The classification of which actions constitute unprotected or protected actions may be designated by a manufacturer, assigned by a user, or determined intelligently by the device. These classifications may be stored in an accessible storage database (e.g., stored locally on the device, remotely on another device, in cloud storage, etc.) and may be adjusted over time. Stated differently, a classification for an action may not necessarily be permanently assigned, but rather, may be adjusted over time (e.g., by a user to change a manufacturer's classification, etc.).

At 302, an embodiment may determine whether an action corresponding to a received command corresponds to a protected action or an unprotected action. In an embodiment, the determination may involve accessing the stored list of action classifications and determining whether the current action substantially matches an action in the list. Responsive to discovering a match, an embodiment may be able to identify the classification associated with the current action.

In some situations, an embodiment may be able to intelligently determine an action classification associated with the current action by using context data. For example, responsive to receiving a user command to close a word document, an embodiment may identify how long the document has been open for and/or how much content is in the document. If the document was only recently opened (e.g., 30 seconds ago, 1 minute ago, etc.) and/or has very little to no content in it, then an embodiment may deduce that the current state of the document is not very important and can be closed without additional user authorization or identification. Conversely, if a document was open for a long period of time, has a great deal of content in it, has been accessed several times of the course of the document's lifetime, etc. then an embodiment may deduce that the document has some importance and may require some type of user authentication before the action is performed.

Responsive to determining, at 302, that the action corresponds to an unprotected action, an embodiment may perform, at 303, the action without authenticating the user. Conversely, responsive to determining, at 302, that the action corresponds to a protected action, an embodiment may request, at 303, user authentication input prior to performing the action.

In an embodiment, a user may be authenticated using one or more user authentication techniques known in the art such as facial recognition, fingerprint identification, smart card, etc. In an embodiment, the request to receive user authentication input may take the form of a notification (e.g., provided audibly by a speaker operatively coupled to a device, provided visually on a display screen operatively coupled to a device, a combination thereof, etc.). The notification may inform the user about what types of user authentication techniques are available and/or what to do to provide the user authentication input (e.g., where to stand, what to look at, what to press, etc.). In another embodiment, the requesting of user authentication input may not even be an explicit request requiring user action, but rather, may be an action that is automatically performed by the device or another device. For example, responsive to determining that an action corresponds to a protected action, an embodiment may immediately capture user authentication data for a detected user (e.g., a picture of their face, etc.).

In an embodiment, the authentication of the user may be performed by at least one other device. For instance, responsive to determining that an action associated with a user command corresponds to a protected action, the target device may communicate with one or more other devices in a connectable network (e.g., one or more home automation devices, one or more Internet of Things devices, etc.) and request them to obtain user authentication data. For example, if a user provides a command to their laptop to delete a file, the laptop may communicate with a smart speaker proximate to the user to obtain facial recognition data. The user may be instructed to stand in front of a camera integral to the smart speaker so that a picture of their face may be captured. Responsive to determining the user is authorized, the validation may be communicated to the laptop that may then perform the protected action.

In an embodiment, devices may be able to perform actions even when they are in a closed state. For example, using the foregoing example, a user may command, using voice input, an always-on digital assistant of a shut laptop to delete a file. Although the display screen of the laptop is shut, microphones integral to the laptop may still be active to receive the command. An embodiment may also allow a closed-state device to communicate with one or more other devices to obtain user authentication data. Responsive to determining that the command was provided by an authorized user, an embodiment may be able to perform the protected action associated with the command, even when the target device is in a closed state.

In an embodiment, the authentication of the user may be conducted by a device determined to be closest to the user. Initially, an embodiment may determine a user's position with respect to other devices (e.g., using one or more position sensors, GPS data, thermal data, motion data, other sensors, a combination thereof, etc.). An embodiment may then identify the device that is closest to the user's position and request that device to perform the user authentication. For example, an embodiment may request a user's smart watch to perform the user authentication because it was determined to be closest to the user (e.g., because it is attached to their wrist, etc.). In another embodiment, the authentication of the user may be conducted by a device determined to be capable of performing a particular authorization technique. For example, if a protected action requires a specific type of authentication to be conducted prior to performance of the action, an embodiment may identify all devices capable of performing that type of authentication technique. An embodiment may then enlist the closest device to the user capable of performing that authentication technique. In such a scenario, the closest device to the user may not necessarily have the capability to perform the type of authentication technique that is required for this particular action so another device must be enlisted (e.g., a smart speaker directly next to the user may not be able to perform fingerprint identification so another device must be enlisted to do so, etc.).

In an embodiment, once the user authentication input is received, an embodiment may determine whether the user authentication input corresponds to an authorized user. This determination may be made by comparing characteristics of the user obtained through the user authorization input to an accessible database comprising a listing of characteristics associated with authorized users. Responsive to determining that the characteristics of the user match those of an authorized user in the database, an embodiment may thereafter perform the protected action. Conversely, responsive to determining that there is no match, an embodiment may provide (e.g., using one or more output devices, etc.) the user with a notification indicating that fact. In an embodiment, the authentication determination may be conducted on the target device (i.e., the device an action was requested to be performed on or by) or by another device and thereafter communicated to the target device.

The various embodiments described herein thus represent a technical improvement to conventional user authorization and action performance techniques. Using the techniques described herein, an embodiment may receive a touchless command to perform an action. An embodiment may thereafter determine whether the action is associated with a protected action and, responsive to determining that it is, request user authentication input prior to performing the action. Responsive to determining that the action is associated with an unprotected action, an embodiment may simply perform the action without authorizing the user. Additionally, an embodiment may be able to enlist the help of other devices to authenticate the user and communicate the results of the authentication process to the target device. Such a method may enable users to ensure that protected actions on touchless command enabled devices are not executed without their authorization.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, a touchless command to perform an action within an active application;

determining, using a processor, whether the action is one of: a protected action and an unprotected action, wherein the determining comprises:
  identifying an amount of user-created content within the active application;
  classifying, based on the amount of the user-created content present within the active application, whether the action is associated with the protected action or the unprotected action;
requesting, responsive to determining that the action is associated with the protected action, user authentication input prior to performing the action; and
performing the protected action responsive to determining that the user authentication input corresponds to the authorized user.

2. The method of claim 1, wherein the touchless command comprises at least one of a voice command and a gesture command.

3. The method of claim 1, wherein the determining comprises accessing a list of the protected actions and the unprotected actions and determining whether the action corresponds to one of the protected actions or the unprotected actions in the list.

4. The method of claim 1, further comprising receiving the user authentication input and determining whether the user authentication input corresponds to an authorized user.

5. The method of claim 1, wherein the performing comprises performing the protected action when the information handling device is in a closed state.

6. The method of claim 1, further comprising authenticating the user authentication input using at least one other device.

7. The method of claim 6, wherein the authenticating comprises authenticating the user authentication input using the at least one other device closest to a user.

8. The method of claim 6, wherein the authenticating is performed using at least one authentication technique selected from the group consisting of facial recognition, fingerprint identification, and password input.

9. The method of claim 1, further comprising performing, without the user authentication input, the action responsive to determining that the action is associated with an unprotected action.

10. An information handling device, comprising:
  a processor;
  a memory device that stores instructions executable by the processor to:
  receive a touchless command to perform an action within an active application;
  determine whether the action is one of: a protected action and an unprotected action, wherein the instructions executable by the processor to determine comprise instructions executable by the processor to:
    identify an amount of user-created content within the active application;
    classify, based on the amount of the user-created content present within the active application, whether the action is associated with the protected action or the unprotected action;
  request, responsive to determining that the action is associated with the protected action, user authentication input prior to performing the action; and
  perform the protected action responsive to determining that the user authentication input corresponds to the authorized user.

11. The information handling device of claim 10, wherein the touchless command comprises at least one of a voice command and a gesture command.

12. The information handling device of claim 10, wherein the instructions executable by the processor to determine comprise instructions executable by the processor to access a list of the protected actions and the unprotected actions and determine whether the action corresponds to one of the protected actions or the unprotected actions in the list.

13. The information handling device of claim 12, wherein the instructions are further executable by the processor to receive the user authentication input and determine whether the user authentication input corresponds to an authorized user.

14. The information handling device of claim 10, wherein the instructions executable by the processor to perform comprise instructions executable by the processor to perform the protected action when the information handling device is in a closed state.

15. The information handling device of claim 10, wherein the instructions are further executable by the processor to authenticate the user authentication input using at least one other device.

16. The information handling device of claim 15, wherein the instructions executable by the processor to authenticate comprise instructions executable by the processor to authenticate the user authentication input using the at least one other device closest to a user.

17. The information handling device of claim 10, wherein the instructions are further executable by the processor to perform, without the user authentication input, the action responsive to determining that the action is associated with an unprotected action.

18. A product, comprising:
  a storage device that stores code, the code being executable by a processor and comprising:
  code that receives a touchless command to perform an action within an active application;
  code that determines whether the action is one of: a protected action and an unprotected action, wherein the code that determines comprises:
    code that identifies an amount of user-created content within the active application;
    code that classifies, based on the amount of the user-created content present within the active application, whether the action is associated with the protected action or the unprotected action; and
  code that requests, responsive to determining that the action is associated with the protected action, user authentication input prior to performing the action; and
  code that performs the protected action responsive to determining that the user authentication input corresponds to the authorized user.

* * * * *